United States Patent [19]

Pakosh

[11] Patent Number: 4,907,402
[45] Date of Patent: Mar. 13, 1990

[54] UNLOADING SYSTEM

[75] Inventor: Daniel Pakosh, Winnipeg, Canada

[73] Assignee: Ford New Holland, Inc., New Holland, Pa.

[21] Appl. No.: 263,983

[22] Filed: Oct. 27, 1988

Related U.S. Application Data

[60] Continuation of Ser. No. 51,234, May 14, 1987, abandoned, which is a continuation of Ser. No. 664,069, Oct. 23, 1984, abandoned, which is a division of Ser. No. 178,074, Aug. 13, 1980, Pat. No. 4,492,237.

[30] Foreign Application Priority Data

Aug. 13, 1979 [CA] Canada ................................ 333765

[51] Int. Cl.⁴ ........................ A01D 41/00; B60P 1/42
[52] U.S. Cl. .................................... 56/14.6; 414/505; 414/526; 460/114; 460/119
[58] Field of Search ............... 56/146, 1; 460/66, 67, 460/69, 75, 76, 77, 80, 81, 83, 114, 119; 414/345, 501–505, 526; 198/666

[56] References Cited

U.S. PATENT DOCUMENTS

| | | | |
|---|---|---|---|
| 2,470,836 | 5/1949 | Piper | 414/526 X |
| 2,479,899 | 8/1949 | Beyer | 198/666 X |
| 2,883,076 | 4/1959 | Palmer | 414/526 |
| 3,107,804 | 10/1963 | Cox | 414/505 |
| 3,286,862 | 11/1966 | Hansen | 414/502 |
| 3,339,758 | 9/1967 | Hubert et al. | 414/526 X |
| 3,490,460 | 1/1970 | Banmeister et al. | 460/119 |
| 3,825,138 | 7/1974 | Pool | 414/505 |
| 4,037,745 | 7/1977 | Hengen et al. | 414/504 |
| 4,060,960 | 12/1977 | Hengen et al. | 414/505 X |
| 4,317,326 | 3/1982 | Riedinger | 56/14.6 |
| 4,415,303 | 11/1983 | Westendorf et al. | 414/526 X |
| 4,419,037 | 12/1983 | Niewold | 414/526 X |

FOREIGN PATENT DOCUMENTS

| | | | |
|---|---|---|---|
| 2013288 | 10/1971 | Fed. Rep. of Germany | 414/526 |
| 1264732 | 2/1972 | United Kingdom | 414/526 |

Primary Examiner—Hoang C. Dang
Attorney, Agent, or Firm—Larry W. Miller; Frank A. Seemar; Darrell F. Marquette

[57] ABSTRACT

An unloading chute for a combine which may be swiveled so as to discharge crop outside the combine to a loading vehicle which may be operated to receive crop from the unloading chute on either side of the combine.

4 Claims, 4 Drawing Sheets

UNLOADING SYSTEM

INTRODUCTION

This application is a continuation of application Ser. No. 051,234 filed May 14, 1987 now abandoned, which in turn is a continuation of application Ser. No. 664,069 filed Oct. 23, 1984 now abanboned, which in turn is a division of application Ser. No. 178,074 filed Aug. 13, 1980, now the U.S. Pat. No. 4,492,237.

This application relates to a new and improved rotary combine harvester and, more particularly, to an unloading chute for such harvesters.

BACKGROUND OF THE INVENTION

In conventional combines, grain is removed from the grain tank by a grain auger located within an unloading chute located on one side of the combine. This chute allows grain to be removed from the grain tank to an unloading or receiving vehicle which is positioned on the side of the combine where the exit portion of the unloading chute is located.

In such unloading systems, there may be no or limited rotational adjustment for the unloading chute available to the operator in order to unload the combine. In any event, the combine must be unloaded on one side only. In normal crop combining applications, this may necessitate that the grain receiving vehicle drive through the swath thereby causing undesirable crop damage. It may also limit the unloading flexibility of the operator by creating unnecessary vehicle movement when two trucks are deployed.

SUMMARY OF THE INVENTION

According to the invention, there is disclosed an unloading chute for a combine comprising an entrance area and an exit outlet, said entrance area being located adjacent a grain tank of said combine, said exit outlet being movable from one side of the longitudinal axis of said combine in a first crop discharge position outside said combine to the opposite side of said longitudinal axis of said combine to a second crop discharge position outside said combine, said unloading chute being operable to discharge crop to a loading vehicle in either of said first and second discharge positions.

BRIEF DESCRIPTION OF THE SEVERAL VIEWS OF THE DRAWINGS

The invention will now be described, by way of example only, with reference to accompanying drawings in which.

DESCRIPTION OF SPECIFIC EMBODIMENT

Figure 1:
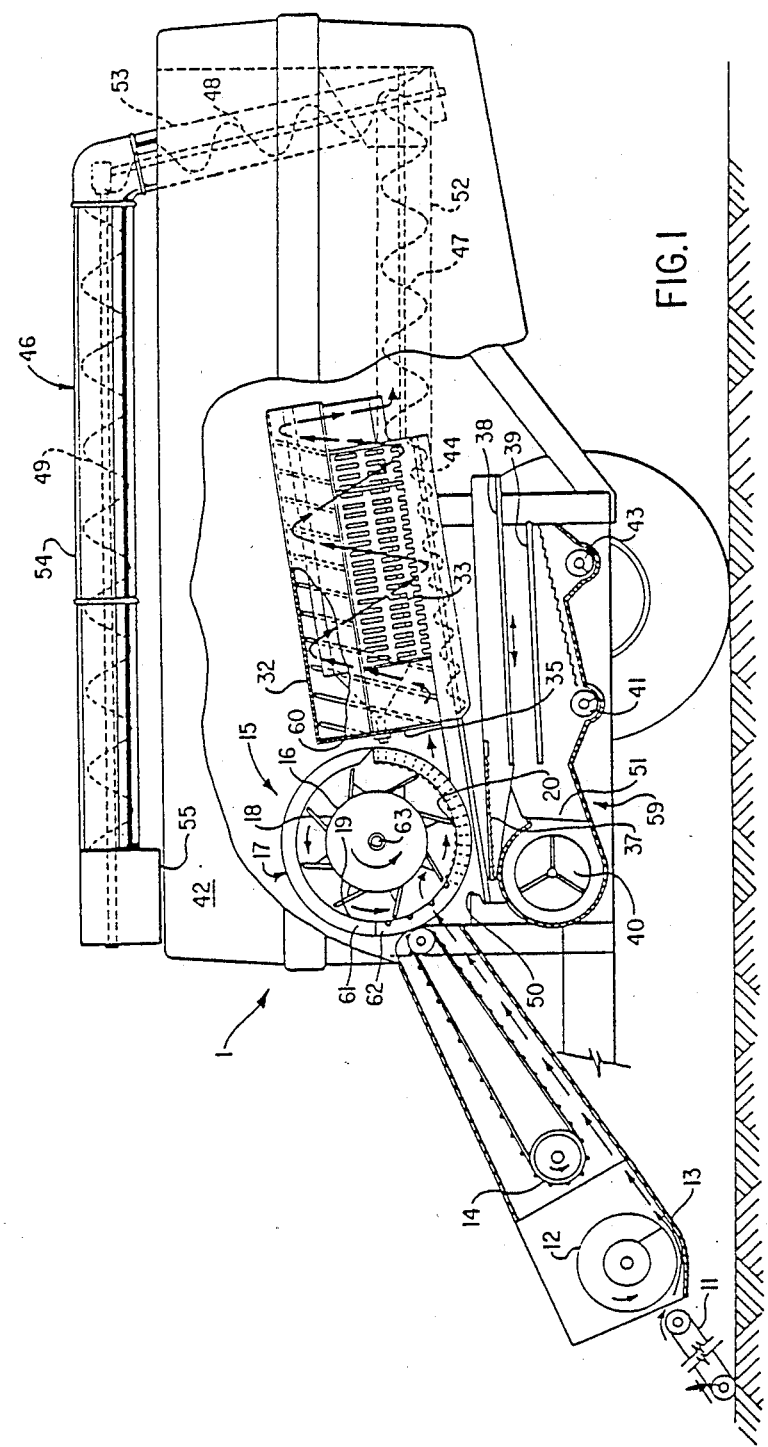
FIG. 1 is a side elevation of the rotary combine according to the invention.

Referring now to the figures and with particular reference to FIG. 1, a crop pickup 11 is located forward of the combine and may be one of several configuratins for receiving the crop.

A table auger 12 located in the table 13 and a feeder elevator 14, in turn, feed crop to the entrance area of the combine. These mechanisms are conventional and further description is not considered necessary. A threshing unit generally denoted 15 is positioned with its longitudinal axis transverse to the longitudinal axis of the combine 1 and comprises a rotor 16 and a cylindrical periphery 17 surrounding the rotor. The rotor 16 has flexible blades 18 mounted thereon and, these are connected by fasteners (not shown) to the rotor 16. The cylindrical periphery 17 comprises a threshing cap 19 on the upper half of the cylinder periphery 17 and a concave 20 of conventional design on the lower half of the periphery 17.

Figure 3:
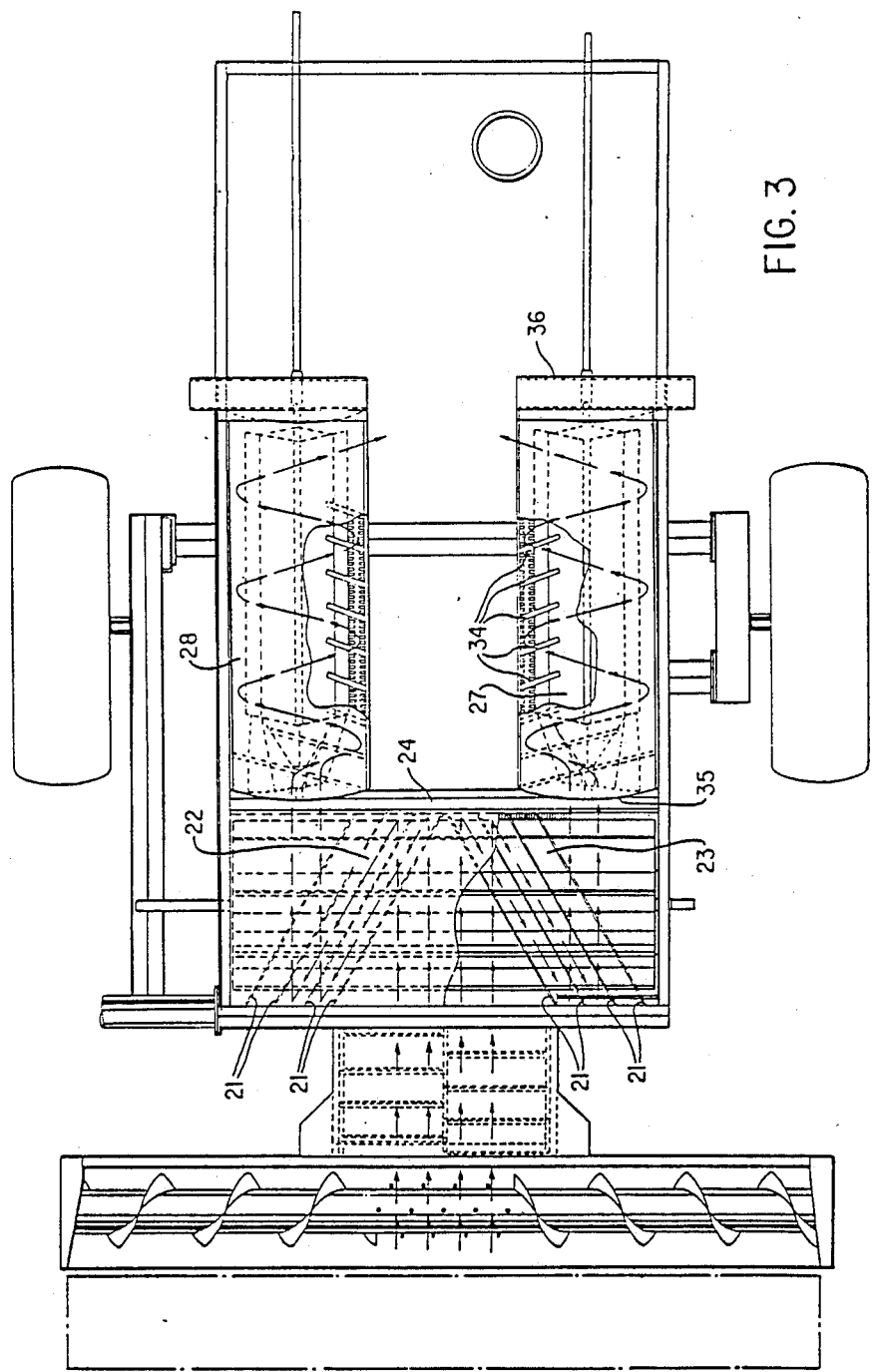
FIG. 3 is a cutaway plan view of the combine of FIG. 1, not illustrating the unloading chute.

Mounted within the threshing unit 15 on the upper cylinder periphery 17 are helical guide vanes 21 (FIG. 3). The several guide vanes are divided into right and left portions 22, 23 respectively, each vane of which begins at the rearward portion 29 of the threshing unit 15 inwardly of the entrance area and extend to the left and right respective end portions.

Figure 2:
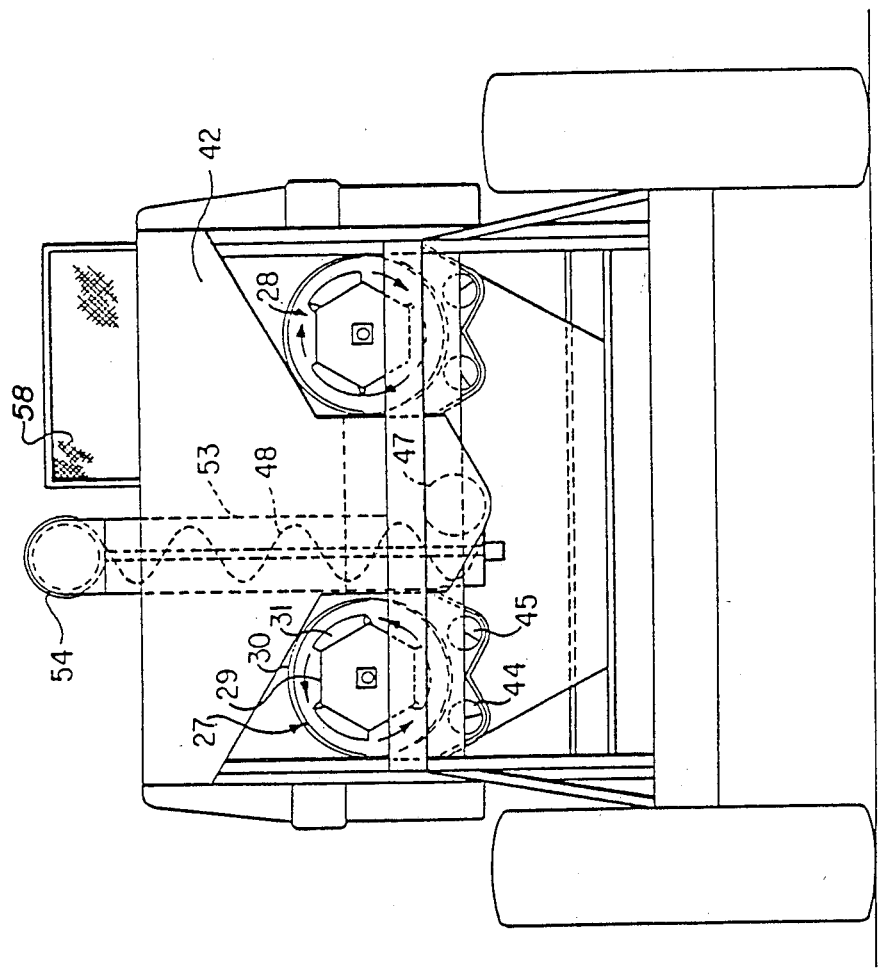
FIG. 2 is a rear view of the combine of FIG. 1.

Located with their longitudinal axes transverse to the longitudinal axis of the threshing unit 15 are first and second separating units 27, 28, respectively. The separating units 27, 28 are substantially identical and, accordingly, only the first separating unit 27 will be described. A separating rotor 29 (FIG. 2) is mounted for rotation within the periphery 30 of the separating unit 27 and metal plates or blades 31 are mounted on the separating rotor 29. The periphery 30 of the separator unit 27 is formed of a solid cylindrical plate 32 over the upper half portion of the cylinder and a perforated grate 33 over the lower portion. Helical guide vanes 34 (FIG. 3) are mounted on the upper portion of the periphery 30 and extend from the entrance area 35 of the separating unit to the exit area 36.

The entrance area 35 of the separating unit has an open area below its longitudinal axis and a plate 60 (FIG. 1) mounted above the axis. An opening (not shown) is provided in the plate 60 and this opening communicates with plenum 61 which extends from the entrance area 35 of the separating assembly to the entrance area 62 of the threshing assembly 15. The plenum is open at the entrance area 62 in the vicinity of elevator 14 and, at the rearward portion of the plenum 61, communicates directly with the opening in plate 60. An arrangement for controlling the size of the opening may be provided such as a mechanically or hydraulically operated sliding shutter valve (not shown).

Augers 44, 45, are mounted below separating assembly 27. Chaffer 38 is located below the rearward portion of the grain pan 37 and is perforated with relatively large openings. A sieve 39 with relatively smaller openings is mounted below the chaffer.

A forced air supply 40 is mounted below the grain pan 37 to disperse air over the grain pan 37 and beneath the chaffer 38 and sieve 39. A centrifugal fan is provided to rotate within the housing of the forced air supply and two openings are provided to allow the necessary air to escape. The first opening 51 allows air to exit below the chaffer 38 and the sieve 39 and the second opening 50 allows air to exit over the grain pan 37.

At the lower portion of the cleaning section, clean grain auger 41 is located. A second auger, return auger 43, is also located at the lower portion of the cleaning section but rearwardly of clean grain auger 41.

Figure 4:
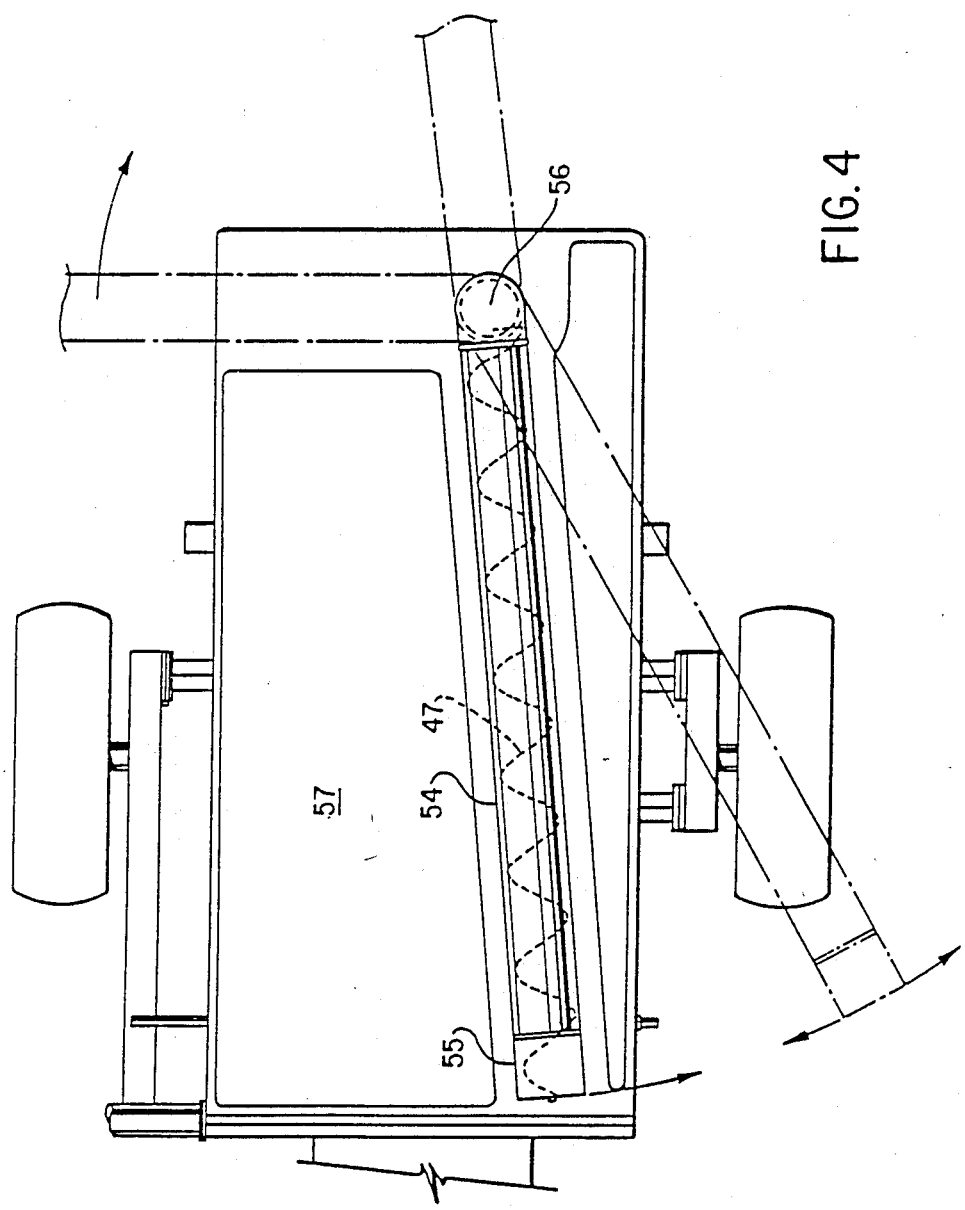
FIG. 4 is a plan view of the combine.

The grain tank 42 is mounted in the upper portion of the combine 1 and extends over and between the separator units 27, 28 and the threshing unit 15. A first section 52 of the discharge or unloading chute generally denoted 46 extends from the grain tank 42 rearwardly to the junction of the first section 52 and the second section 53. The second section 53 extends upwardly and forwardly and terminates at the junction of it and the third section 54. The third section 54 extends forwardly and terminates in a grain exit means 55. Within each of the three sections, respectively, are grain handling augers 47, 48, 49 which convey the grain from the grain tank 42 to the grain exit means 55. Suitable gear drives are provided to rotate the augers under power and to allow for rotation of the third section 54 of the discharge chute about the axis 56 (FIG. 4). Third section 54 is rotatable through an angle of approximately 270° as seen in FIG. 4. In the area generally denoted 57, a screen 58 is provided about the top of the grain tank 42 to allow visual inspection by the operator of the quantity of grain in the grain tank.

In operation, swathed crop is received by crop pickup 11 and enters table auger 12 where it is conveyed from both sides towards the central portion and into feeder elevator 14. Feeder elevator 14 conveys the crop, in turn, to the central entrance area 62 of threshing unit 15 along a plane substantially parallel to the longitudinal axis of the rotor 16 of the threshing unit 15 and such that the crop smoothly enters the threshing unit 15 below its axis 63.

As the crop enters the threshing unit 15, the crop is subject to the initial threshing action of the flexible blades 18 over approximately 100° before it is divided by the guide vanes 22, 23 and conveyed to each side of the threshing unit 15, while continuing to be subjected to the flailing action of the flexible blades 18. A substantial portion of grain is removed from the crop in the threshing unit 15 and these free grain kernels pass through the concave 20 together with grain heads and some chaff onto the oscillating grain pan 37.

The threshed crop then passes from the exit means of the threshing unit 15 axially into the separators 27, 28 below the centre portions. Since the action of both separators is substantially identical, only one will be described. The crop axially enters the entrance area 35 of separator 27 and is conveyed in a layer along the periphery 30 by the combined action of the helical guide vanes 34 and the rotor 31. Grain remaining in the crop and, as well, grain heads and some chaff will pass through the grate 33 and fall downwardly into the augers 44, 45. Augers 44, 45 convey the grain, grain heads and any chaff which still remains to the forward portion beneath the separator where it drops towards grain pan 37. Remaining material will exit from the separator 27 and be deposited on the ground.

As the grain, grain heads and chaff fall downwardly from, respectively, the concave 20 of the thresher and the augers 44, 45 of the separating units, they come under the influence of the cleaner generally denoted 59. Air exits at opening 50 to pass over the grain pan 37 and from opening 51 to pass through chaffer 38 and sieve 39 from the bottom upwardly. The action of the air from the forced air supply 40 blows the lighter chaff out the exit of the combine 1 while allowing the grain and grain heads to pass to the clean grain auger 41 and return auger 43, respectively, through chaffer 38 and sieve 39. An elevator (not shown) conveys the grain from the exit of clean grain auger 41 to the grain tank 42. Grain heads which pass to return auger 43 are conveyed to a rethresher (not shown) after which they are blown into separator unit 27.

The separators 27, 28 also provide a suction for the plenum 61. The suction exists at the entrance at the area 62 of the threshing unit and acts to reduce the chaff and other debris by removing it from the atmosphere immediately forward of the threshing unit.

When the operator desires to unload the grain tank 42, he activates the augers 47, 48, 49 and directs the grain exit means 55, either by hydraulic means or otherwise, to either side of the combine, as may be desired. Grain then passes from the grain tank 42 to a truck or other transportation device which receives the unloaded grain.

While a specific embodiment of the invention has been described, such description should be taken as illustrative only and not as limiting the scope of the invention as construed in accordance with the accompanying claims.

I claim:

1. In a combine harvester having a mobile frame adapted for movement over a field; a crop threshing and separating means mounted on said frame to thresh and separate grain from crop material; a crop gathering means forwardly supported from said frame for collecting crop material from the field and conveying said crop material to said threshing and separating means; a cleaning mechanism supported on said frame below said threshing and separating means to receive grain therefrom and to clean unwanted debris from said grain; a clean grain tank supported by said frame above said cleaning mechanism and including collecting means to collect said cleaned grain for elevation into said clean grain tank; and an unloading mechanism operatively associated with said clean grain tank for selectively discharging clean grain therefrom externally of said combine harvester, an improved unloading mechanism comprising:

a generally upright auger section positioned proximate to a longitudinally extending centerline of said combine harvester and adjacent to rearwardmost portion of said combine harvester, said upright auger section extending from adjacent a lowermost portion of said grain tank to a position elevated above said grain tank; and a generally horizontal auger section operatively connected to said upright auger section in flow communication therewith and having a remote discharge opening, said horizontal auger section having a transport position wherein said horizontal auger section extends generally forwardly from said upright auger section to position said discharge opening over said clean grain tank, said horizontal auger section being rotatable about an axis corresponding to said generally upright auger section through an arc of rotation having an angular displacement of approximately 270 degrees from said transport position, extending along one side of said combine harvester and rearwardly thereof to the opposing side of said combine harvester to permit the discharge of grain from said clean grain tank through said discharge opening along said arc of rotation substantially equidistantly on either side of said combine harvester.

2. The combine harvester of claim 1 wherein said generally upright auger section is inclined forwardly so that said discharge opening will be positioned higher along said arc of rotation than at said transport position.

3. The combine harvester of claim 2 wherein said threshing and separating means includes a pair of transversely spaced, longitudinally extending rotors, said grain tank including a saddle portion positioned between said rotors, said grain tank having a configuration such that the grain therein flows into said saddle portion.

4. The combine harvester of claim 3 wherein said saddle portion has a V-shaped bottom forming a collection trough, said unloading mechanism further including a collecting auger positioned within said collection trough to convey grain to said generally upright auger position.

* * * * *